Figure 1:
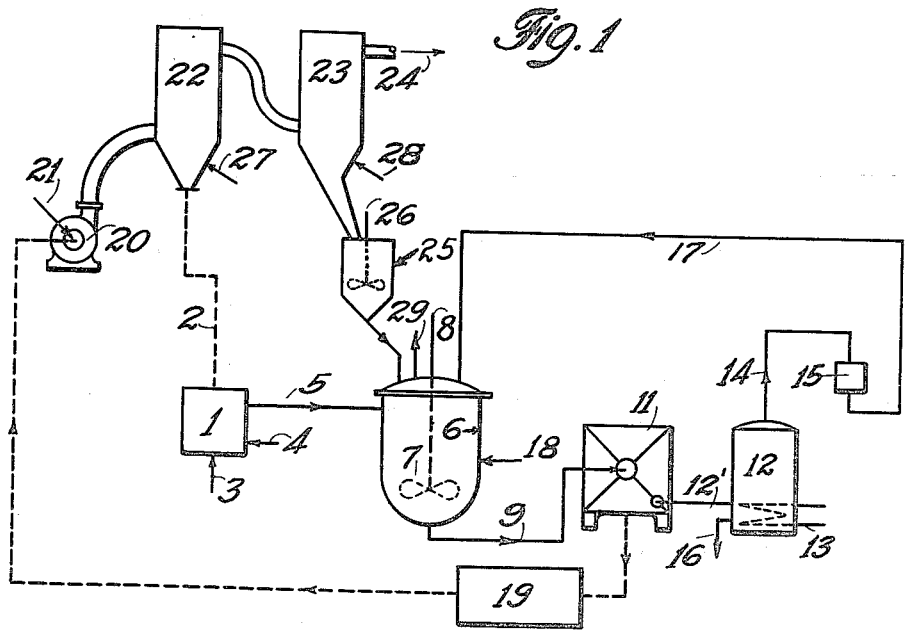

Oct. 17, 1933.　　　　　J. F. WAIT　　　　　1,930,572
PROCESS OF TREATING AND USING ADSORPTIVE SURFACES
Filed June 13, 1930

INVENTOR

Patented Oct. 17, 1933

1,930,572

UNITED STATES PATENT OFFICE 1,930,572

PROCESS OF TREATING AND USING ADSORPTIVE SURFACES

Justin F. Wait, New York, N. Y.

Application June 13, 1930. Serial No. 461,038

24 Claims. (Cl. 252—2)

This invention relates to improvements in the process of producing and treating surfaces of particles of substances which may be used for treating fluids such as oils and alcohols in liquid and in vapor form and for other purposes. The invention involves contact preparation of material and use thereof as for adsorption such as is obtained by contacting a colloidal or other solid porous substance with a fluid and in a manner to give high purification efficiency and low yield of by-products.

Adsorption of impurities at the surface film of the solid porous substance makes it possible to separate such impurities and so purify a fluid. The common procedure is to grind particles of such a substance as fuller's earth or colloidal clay and to use particles of between about 50 and 100 mesh for treatment of gaseous fluids and particles of between about 100 and about 400 mesh for treatment of a liquid fluid. Production of the finer particles generally involves air flotation wherein air, at controlled velocity, contacts and carries or "floats" the small particles.

The porous substance contains a large amount of gases including oxygen adsorbed at its relatively large surface. Such gases as oxygen, in particular, cause reaction in the liquid and often form by-products such as oxidized and/or polymerized substances. The presence of an inner gas or the replacement of the normally contained gas with an inert or protective gas or vapor will retard such by-product formation and may be controlled to influence and/or cause a desired reaction.

The common procedure thus involving preparation of finely divided particles which contain occluded gases containing oxygen, has a detrimental effect, whereas my invention involves special treatment whereby those effects may be reduced or entirely eliminated. My process involves means for preventing the occurrence of all or part of such occluded gases. This means may be physical displacement in the vapor phase or it may involve the use of a liquid, either alone or in combination with a vapor phase. For example the adsorptive substance may be wetted by a liquid and vapors caused to arise therefrom as by applying heat at suitable pressure which may be subatmospheric. The discharged vapors will thus carry with them portions of the gas previously occluded in the substance.

Another method of removing occluded gases involves subjection of the substance through a vacuum wherein the amount of occluded gases is decreased by virtue of the re-established equilibrium between the occluded gases and the pressures surrounding same. The removed gases may then be replaced by gases which are inert or which will exert a desired influence.

An adsorptive substance may thus be contacted with a liquid and hydrogen, carbon monoxide or other reducing or inert gas bubbled through the mass. This removes portions of the detrimental gases normally contained in the substance and gives a protective action. The hydrogen or other gas is also then available for reaction should the conditions be such as to cause such reaction as by chemical addition to portions of the liquid to be treated or otherwise.

Advantages may be obtained by wetting the adsorptive substances with a liquid which is miscible with the substance to be treated. For example the substance which is originally wetted with water may be wetted with an alcohol miscible therewith and which forms a mass of the substance which permits the adsorptive substances to contact closely with an oily substance which is miscible with alcohol. This method greatly increases the efficiency of the adsorptive substances as regards the kinds of impurities which it may remove and/or the capacity thereof to remove such impurities.

Another method may involve the mixing of a substance wetted with water with a light or volatile oil and applying heat or otherwise causing vapors of the oil to remove the water vapors.

This results in an adsorptive substance which is wetted with an oil and from which part or all of the water has been removed. The oil used may be the same or different composition as regards the oil to be treated. The process may also involve methods of recovering such oil when different and reuse thereof for the treatment of subsequent quantities of adsorptive substances which subsequent quantities may be the identical particles previously treated and which are to again be used in the purification process. For example, an oil A may be used for treating an adsorptive substance K which is to be used for treating some of oil A or some of oil B in which case oil B is of different composition as regards oil A. The process may also involve methods of recovering oil A which is different from oil B which is treated and reuse of oil A for subsequent treatment of an adsorbent substance L which substance L may be the identical particles formerly comprising substance K and which particle, now L though previously K, are to again be used in the justification process.

The effectiveness of an adsorptive substance is a function of the area of the surface which contacts with the fluid to be treated. The surface in turn is a function of the size of particle; wherefore particles of very small size are preferable when treating a fluid. Advantages of the small size are however generally offset in applying them. They increase the time element required to pass a fluid through a mass of such particles, as for example vapors through a layer thereof or liquid being filtered or passed through a mass contained on a filtering medium. Small particles also retard velocity of separation, because sizes which are sufficient to yield a high specific surface approach a colloid in dimension and particles of this dimension are difficult to settle as by gravitation or its equivalent centrifugal action.

My invention involves means whereby the objections to the smaller particle are overcome and yet a very large portion of the adsorbed substances occurs as active surface. This may be done as by depositing very finely divided particles, preferably of colloid dimension, on the surface of larger particles and in a manner whereby the smaller particles are attached thereto in a positive manner. This may be done before or after adsorption of impurities. Large particles may thus be produced which contain a thin layer of the adsorptive substance, the combination being easily separated as by settling or filtration and being otherwise suitable for the controlled motion of a fluid with reference to the particles. The dimension of the smaller particles are below about 2/1000″ and may be diminished in size to about the dimensions of a molecule. A "molecular layer" of the adsorptive substances covering larger particles being an ideal condition although difficult to obtain.

An example of the materials which will be suitable for this combination is the combination of a colloidal bentonite which has been highly dispersed and caused to contact with and adhere to larger particles such as diatomaceous earth, the size of the latter being preferably of the order of one one hundredth of an inch for some purposes.

One method of causing suitable contact between the small adsorptive particles of an adsorptive substance and the larger carrier particles, is to give the one sort of particles a negative charge and the other sort of particles a positive charge. This may be done as by causing adsorption of salts or other chemical which will cause adsorption one particle to attract the other. Direct application of an electricity such as an electrostatic charge may be used.

Advantages may be gained by treating some of the parts with an acid and others with an alkali. This method may be extended to a process whereby one adsorptive material is treated with acid and another with alkali the two being dried before mixing so that when an oil is treated for purification the advantages of both acid and alkaline adsorptive material may be realized. Some salts which are acid and others which are alkaline in effect may be used as the equivalent thereof. The alkaline treated substance may have been pretreated with acid. Substances so treated may be alike or similar. Some impurities are adsorbed to a greater extent by one than by the other. The so purified liquid is then separated from the substances removing such impurities as by filtration or electric precipitation. A desired mixture for some purposes would be made from particles which would show on test a pH of between about 4 and 7 which particles would be mixed with particles which would show on test a pH of between 7 and about 13.

The method of mixing particles, which have definite properties of adsorption and/or reaction may include the bringing together of acid and alkali treated material. Under such conditions there will be no reaction between the acid and the alkali, or at least none until they have been mixed or contacted with the fluid to be treated. The two products to be mixed may be different as to the potential and/or as to polarity. Each of the preceding may be varied by having one material of one size and the other of a second size.

An alkalinity which will show on a test pH in excess of about 7.6 and as high as about 14, may be used to cause and/or maintain dispersion for the process of coating the carrier particles. After the coating has been completed the pH may then be reduced to about 7 or below. My process therefore involves alteration of the hydrogen-ion concentration after the mixing and/or coating has been completed. These figures are given for aqueous dispersing medium. The manner in which oily liquids may be controlled is the subject of another application and it has been required that a special control means be worked out therefor and this must in general be varied for each set of conditions including the nature of the substance to be treated. Applicant has found that such control may be established by using the pH control as indicated and independently of the acidic or basic substance used. The adsorptive substance is thus treated and may then be dried and then directly contacted with the oil to be treated or through an intermediary step of a mutually miscible liquid. The process is generally applicable to treatment of adsorptive substances for purposes indicated. The correct control must be worked out in such instance, wherefore, a specific example would not be expected to yield workable efficiency if at all except for the particular conditions thereof. In carrying out the invention one must take the available substance and treat a number of samples each in a different way and then apply these as to the substance to be purified under a different temperature and with a different concentration and then note the results. The procedure should then be repeated and the method extended in the direction yielding the greatest efficiency as regards the result sought. This procedure is obviously of the "cut and try" type but is necessary because of the great variance in each condition of application.

An oxide of nitrogen may be used to treat a dispersed mineral of the class herein described which are suitable for the purposes herein disclosed and including minerals which are adsorptive as regards impurities or those which may be treated to render them so. The nature of such minerals is such that this will cause greater activity under some conditions as may be attributed to the reaction of particles of metallic silicate and/or sulphate of such mineral as they are reacted on by an oxide of nitrogen with the formation of a colloidal form of silica and sulphuric acid as the case may be. This acts as if an etching took place with a resulting increase in surface area and/or "porosity" and hence adsorptive surface activity as regards action such as removal of impurities. While such appears to be the case, I do not commit myself to such exact mechanism of such reaction. Ammonia may be used to modify the action of the oxide of nitrogen or independently to cause or yield special properties, being often naturally associated with the oxide or being easily applied by standard means such as addition of aqueous ammonia to the desired point of acidity or in excess to yield an alkalinity. I am aware that a strong alkali such as sodium hydroxide has been used to increase dispersion however it also decreases activity. By using ammonia the dispersion and the activity may be increased.

Such gaseous products may be used to treat the adsorptive substance and/or the carrier. In using such gases as sulphur dioxide and oxides of nitrogen conditions may be controlled to alter products such as calcium nitrate or other chemical which may be contained in the substance. Such a reaction is generally carried out in the vapor phase as by contacting finely divided particles with the gas of appropriate concentration. Such treatment may be combined with air separation or flotation of the finely divided particles. The method of treatment need be but to introduce the treating gas into the gaseous fluid used in the well known methods of air separation and flotation. The gas may also be applied as by treating particles wetted by a non-aqueous liquid for example as by bubbling the gas through such particles suspended in an organic solution.

To insure proper dispersion of the adsorptive agent the adsorptive substance may be created or modified electrically. For example one or both electrodes of an arc or equivalent discharge may be made of the substance. If the substance is agglomerated the agglomeration may serve as the electrode, if dispersed it may be made into the required electrode form by any of the well known methods. Passage of the current causes dispersion within the liquid to be treated or an intermediate fluid in which acid or other treatment may be carried out. The highly dispersed substance may be produced in the proximity of a carrier and be controlled so that it will cause the fine particles to closely contact the larger particles of the carrier. Coagulation or agglomeration as among the newly formed adsorptive surfaces may be retarded or prevented, it being preferable that such operation be carried out so as not to allow of appreciable or great time interval to elapse as between the time the surface is formed and the time it is contacted with the carrier. The method of closely contacting may be one commonly employed and as selected to meet the particular conditions of the specific materials involved. Under some conditions, it is desirable to form the fine particles and the carrier of like or similar materials.

The arc, or equivalent discharge, may be carried out in most any fluid dispersing mediums. If the liquid to be purified is oil, it is preferable that the dispersion be in a liquid and one which is readily miscible with the oil to be treated. A gaseous fluid may be caused to influence the effect of said discharge, for example, hydrogen gas may be injected through one electrode which may be made hollow in which case the adsorptive substance may react under the influence thereof or the hydrogen or other gas may react with the liquid and/or influence the properties of the substance.

By causing a continuous flow of liquid through the discharge zone, it is possible to treat successive portions of a liquid and to cause approximate uniformity of such successive portions. While the dispersed particles are very fine in size, there is frequently a strong tendency for them to coagulate or agglomerate, thus defeating the purpose. My process thus involves use at or near the point of formation of such particles and with a short time element. The location and means of transfer should preferably be such that the elapsed time, from formation to use, shall not exceed that which will agglomerate about ten or twenty percent and I have found that under some conditions the time should be kept below about one hour and in certain instances below about a minute. Where the formation is within a portion of the fluid to be treated, rapid mixing and/or transfer of the fluid mass may be imposed to insure its contact in appropriate amounts and places within about a minute. The location of the point is obviously so required to be a function of transfer and mixing speed. If a longer time element is desired it is sometimes desirable to add in the zone, or in close proximity thereof, a peptizing agent which will keep the particles from thus fastening to one another. By zone is meant the zone of discharge in which the arc or equivalent discharge may be carried out as herein disclosed and/or for the purposes herein described. This agent may be one which forms a protective coating or one which causes the small particles to assume a charge, or be charged, with the net result that the similarly charged particles will repel one another. Under some conditions a gaseous or other substance may be used for an equivalent purpose. If the finely divided particles are so formed in a liquid to be treated, or a liquid miscible therewith, it becomes possible to cause the desired adsorption before appreciable agglomeration has taken place or the activity materially reduced. My process may thus involve a short time element between the time of formation of the finely divided particles and the time of action or use thereof.

If reduction is desired, hydrogen gas or other reducing agent may be mixed with the finely divided particles and in a manner whereby such particles may act as a catalyst and so cause or influence the desired reduction or hydrogenation. Similarly other actions such as oxidation may be caused or influenced as by contacting oxygen with the finely divided particles, acting as a catalyst, and in a manner to cause or influence the reaction of oxygen, or other chemicals as may be involved. Such reaction is thus intensified and influenced by or caused by the state of subdivision.

Conditions of reaction such as temperature, pressure and concentration may be controlled as required to produce the desired results. The process therefore involves methods and means of controlling such conditions while the finely divided particles are reacting or influencing reaction.

The term "adsorptive substance" is intended to mean a substance which is able to adsorb impurities from a liquid or to equivalently act as regarding separating one substance from another or concentrating one with respect to another.

The term "mineral" as herein used is intended to be limited to solid compounds of elements as contrasted with free elements such as gold, carbon and the like. It includes such substances as metallic silicates of complex and simple nature.

As an example I offer the general procedure wherein Barbourite, a commercial form of colloidal bentonite and occurring with sulphate of calcium and other natural products. This material may be treated by forming a fluid mass as by addition of several parts of water. The mixture is then passed downward through an open tower. Air is blown through a container of nitrogen tetroxide, and passed upwardly into the tower so contacting the downflowing liquid. The temperature is kept at about 40° C. The rate of feed of the components is fixed by taking out samples for test and processing them to determine efficient operating conditions approaching the optimum.

The treated mass is nearly neutralized with ammonia to yield a slightly acidic substance and treated with excess of ammonia to yield basic material, the choice is dependent upon the application and results desired. The slightly acid material may be dried as by flowing the mass into towers through which heated gas is passed and recirculated, a cooling and water precipitating stage being applied to remove water or new gas may be continuously added. An air separator of convenient type may be used to separate small from large particles.

The large particles are preferably compressed into electrode form and placed within an oil in which dispersion is to be carried out. This oil continuously flows and passes into contact with portions of mineral oil for treatment thereof. The successive portions are preferably alike as to adsorptive agent content as so formed. Hydrogen or other reducing gas is injected through a hollow of one electrode and maintained over the liquid surface during contact, the action being protective and reduction of oxygen containing and unsaturated compounds being carried out. Separation may be effected as by filtration with a resulting improved form of oil of less color and odor.

The temperature during contact is preferably at between about 100° C. and 300° C. Closed vessels are required for exclusion of air and to prevent volatilization. The separated adsorbtive surface may be reused or treated for use.

The finer particles generally contain from about one to ten percent of water. With air excluded they are preferably wet with alcohol and in the presence of alkali treated particles of fuller's earth of selected size. This step may be done in aqueous dispersion. The alcohol is replaced in successive portions as in a filter washing step and the cake then passed into contact with oil to be treated. The temperatures and pressures should be as experimental tests direct that desired results may be obtained.

Since oils vary and the mineral vary and the desired results vary it is necessary to work out each case separately and to empirically establish an operating procedure for each application that near optimum conditions will be had. I do not limit my claims to the exact method, sequence of operation and the like as herein described.

A manner in which my invention may be carried out is illustrated in the drawing. Fig. 1 shows a schematic arrangement of apparatus. A dispersing means 1 is supplied with mineral to be dispersed as indicated by line 2 and a liquid supply line 3 which may connect with an aspirator or other means for mixing gaseous and liquid fluids. By such means water, oil or alcoholic or other liquid may be introduced. A secondary gaseous fluid inlet 4 may be provided as indicated in detail in Fig. 2.

An outlet 5 connects with mixing vessel 6 with agitator 7 driven as by shaft 8. This vessel may be provided with temperature control means and is preferably built to withstand pressure and with vent and other lines as required. The contacted or mixed mass may be flowed through line 9 to filter 11 which for large scale operation is preferably of the enclosed continuous drum type as illustrated in Patent 1,512,321. For batch operation the indicated filter press type may be used. Filtrate is flowed through line 12' to evaporator 12 with heating coil connection 13 for steam, mercury vapors or other heating means. Vapors of more volatile liquid such as an alcohol or light oil flow as through line 14 to condenser 15. Treated liquid may be withdrawn as through line 16. A fractionating column not shown may be placed in line 14 with appropriate connections and parts. The recovered light product is shown as being flowed through line 17 to vessel 6. New liquid or reducing gaseous fluid may be reduced as by line 18. Valves, storage tanks and other like parts are required to suit the operating requirements.

Filter cake may be passed to a dryer as indicated by 19. Vapors therefrom may be recovered as by means of a condenser. In some instances air is preferably excluded from the filter cake especially after drying. The recovered product may be passed for reuse as by being treated by a Raymond or other mill 20 with inlet for gaseous fluid 21. The suspended particles may be separated in separators 22 and 23. Vent line 24 may pass through bags or the like for high particle recovery. Heavier particles from 22 may be agglomerated into electrode or other form and passed into dispersing means 1. Other particles from 23 may flow into mixer 25 with agitator driven by shaft 26. The particles from 22 may be returned to mill 20. The fines such as would pass through 24 may be used for other purposes.

Treating agent such as an oxide of nitrogen may be introduced as at 21, 27 or 28 and vented as through 24. Hydrogen gas may be introduced as at 21 so as to exclude air or to maintain a reducing atmosphere throughout the dispersing step and until contact with liquid to be treated in vessel 6. For intensive action or other purpose hydrogen may be simultaneously introduced as indicated by line 18 which may terminate in a distributing coil at the bottom of vessel 6. A vent line 29 may be used as for the escape of hydrogen or other gaseous fluid.

Figure 2:
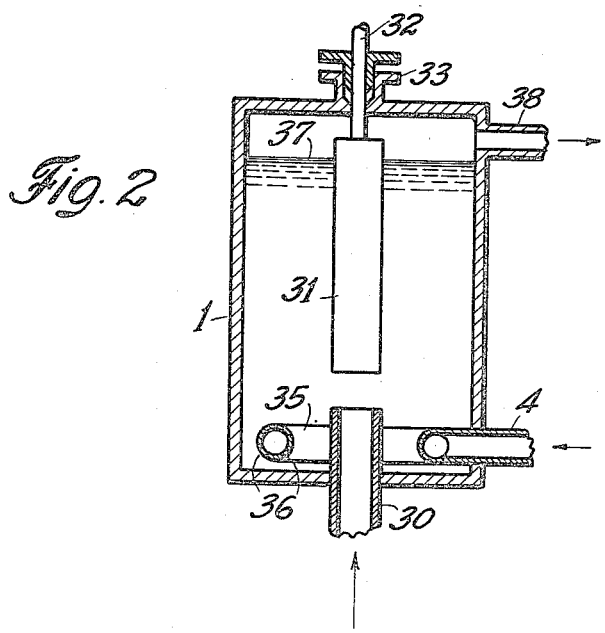

Fig. 2 is illustrative of an electrical dispersing means. A vessel 1 is shown as containing a hollow metallic electrode 30, preferably of non-dispersible or slightly dispersible metal or of a mineral harder than the dispersing electrode 31 which may be carried as by rod 32 adjusted through stuffing box 33 or adjustable within vessel 1. A line 4 with distributing coil 35 with holes 36 may be used to introduce reactive gas a portion of which may also be flowed through inlet 30. The liquid is shown as being at level 37 and held thereat by overflow 38 which may connect with pump to flow gases and liquid into vessel 6. In some instances a part or nearly all of the gas is preferably vented between vessels 1 and 6. Other approximately equivalent apparatus and arrangements may be utilized for carrying out the indicated step wherefore I do not limit my claims to the illustrated arrangement.

I claim:

1. The process which comprises forming a dispersed adsorptive surface within water, replacing said water with a medium miscible both with the water and an oil to be treated therewith and in a manner to insure close contact between the adsorptive substance and the oil to be treated.

2. The process which comprises forming an adsorptive substance within a liquid miscible with an oil so wetting said substance, contacting the so-wetted substance with an oil, causing impurities to be adsorbed by said substance so purifying said oil, separating portions of the wetting liquid from the so-treated oil and causing the said wetting liquid to wet other portions of adsorptive substances.

3. The process which comprises forming an electrode of a mineral, passing electric current between said electrode and another electrode surrounding the discharge zone with a liquid, forming finely divided particles of said mineral having adsorptive properties and contacting such particles with a fluid in a manner to remove impurities therefrom.

4. The process which comprises forming an electrode of a mineral, passing electric current between said electrode and another electrode causing a gaseous substance to desirably influence the effect of said discharge.

5. The process which comprises causing electric discharge through a liquid between a mineral electrode and another electrode, passing a liquid through the so-formed discharge zone and dispersing said mineral as a colloidal substance in the presence of a gaseous fluid and so causing improvement in a portion of said liquid by changing the composition thereof under the influence of said substance.

6. The process which comprises causing electric discharge through a liquid between a mineral electrode and another electrode, passing a liquid through the so-formed discharge zone and dispersing said mineral as a colloidal substance and quickly contacting the same with a reactive gaseous fluid and so causing improvement in a portion of said liquid and subsequently separating said improved liquid from said dispersed particles.

7. The process which comprises passing an electric discharge in a fluid causing a nonmetallic mineral to be dispersed by said discharge, adsorbing impurities contained in a liquid by means of the so-dispersed mineral and separating so purified liquid therefrom.

8. The process which comprises forming electrically dispersed particles in a flowing liquid and causing successive portions to contain approximately equal amounts of said dispersed particles.

9. The process which comprises forming electrically dispersed particles in a liquid through a discharge zone and causing said particles to react adsorptively with a portion of a liquid.

10. The process which comprises forming a dispersed adsorptive surface within water, replacing said water with a medium miscible with both water and an oil to be treated to contacting oil to be treated with the so treated surface and in a manner to insure high dispersion and close contact and with the substantial exclusion of air.

11. The process which comprises treating particles of an absorptive mineral of the class described with a gaseous oxide of nitrogen, in a manner to cause reaction between said oxide and a component of said mineral and so altering said component and increasing the adsorptive activity of said particles.

12. The process which comprises treating particles of an adsorptive mineral of the class described with a gaseous oxide of nitrogen and in a manner approaching the optimum to alter the same and increase the activity thereof as regards adsorption of substances with which said particles are subsequently contacted.

13. The process which comprises forming an adsorptive surface in a liquid miscible with oil and water, contacting the so-wetted substance with oil to be treated, separating so purified oil from portions of adsorptive surface and separating portions of said miscible liquid from portions of treated oil.

14. The process which comprises forming a highly dispersed mineral within a liquid and associating a reactive gaseous fluid with the so-dispersed mineral and promoting reaction between said gaseous fluid associated with the mineral at one temperature and contacting liquid with the so formed mixture at a different temperature and within about ten minutes from time of associating said fluid with the mineral.

15. The process which comprises depositing adsorptive mineral particles of below about two one thousandths of an inch in size on substantially larger particles of another mineral substance in a manner to cover the surfaces of the larger particles individually in substantially their entirety and to secure such deposited position and to form a compounded mineral substance with effectiveness of highly dispersed particles and separability of the larger particles, subsequently contacting the compounded substance with oil to be treated and removing impurities therefrom and separating so-purified fluid from the compounded substance and impurities contained therewith.

16. The process which comprises depositing highly dispersed adsorptive particles on the surface of relatively large particles of another mineral to form a coating thereon to form a composite substance containing less than about 10% of the highly dispersed substance, and contacting the composite with oil to be purified, adsorbing impurities on the deposited adsorptive surface of the composite substance, and separating the composite substance from so purified liquid.

17. In contact purification by means of highly dispersed adsorptive clay-like agent the process which comprises dispersing a clay-like substance to a high degree while excluding air during dispersion preventing substantial agglomeration of the formed particles and conducting the said contact in a reducing atmosphere with respect to the fluid being contacted.

18. The process which comprises dispersing an adsorptive surface to form finely divided particles while excluding air during dispersion, treating the particles with a gas which is reactive as regards a component of the particles, causing a chemical reaction between a portion of the substance in divided form and said gas and so causing said particles to adsorb impurities from a liquid contacting the same.

19. The process which comprises forming an electrical discharge zone between a mineral electrode and another electrode, flowing a liquid through the zone during discharge thereby forming highly dispersed mineral in the liquid, and preventing appreciable amounts of dispersed mineral from flowing through the discharge zone after said mineral has been dispersed.

20. The process which comprises causing electric discharge through a liquid between a mineral electrode and another electrode, passing a liquid through the so-formed discharge zone and dispersing said mineral as a colloidal substance in the presence of a reactive gaseous agent which will produce a desired change in form of a component of the so-formed mixture.

21. The process which comprises forming a dispersed adsorptive substance in a non-oily and non-aqueous liquid which liquid is miscible both with oil and water, contacting the dispersed substance with an oily liquid and absorbing impurities from the oily liquid thereby and separating so purified oily liquid.

22. In a process of refining oils by contact with an adsorptive agent which has been highly dispersed, the process which comprises replacing air contained in the agent with reducing gaseous fluid, and applying the agent to refine oil in a reducing atmosphere at a temperature sufficiently low to prevent appreciable volatilization of the oil.

23. The process which comprises forming a thin coating of highly dispersed adsorptive mineral on mineral particles of above 400 mesh in size contained in non-oily liquid, removing substantially all of the non-oily liquid and contacting oil with the coated particles, and separating so purified oil from the particles.

24. The process which comprises forming a thin coating of highly dispersed particles on individual particles of large particles of mineral matter contained in water, contacting water wet coated particles with a volatile oil, applying heat to remove substantially all of the water with some oil vapors, and contacting the coated particles with an oil and adsorbing impurities therefrom.

JUSTIN F. WAIT.